US012811512B2

(12) United States Patent
Lim et al.

(10) Patent No.: US 12,811,512 B2
(45) Date of Patent: Nov. 24, 2026

(54) POWER SOLID-STATE TRANSFORMER MODULE AND TRANSFORMER USING SAME

(71) Applicant: LS ELECTRIC CO., LTD., Anyang-si (KR)

(72) Inventors: Jeong Woo Lim, Anyang-si (KR); Jae Ho Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 176 days.

(21) Appl. No.: 18/727,784

(22) PCT Filed: Jan. 26, 2023

(86) PCT No.: PCT/KR2023/001157
§ 371 (c)(1),
(2) Date: Jul. 10, 2024

(87) PCT Pub. No.: WO2023/146282
PCT Pub. Date: Aug. 3, 2023

(65) Prior Publication Data
US 2025/0226754 A1 Jul. 10, 2025

(30) Foreign Application Priority Data
Jan. 27, 2022 (KR) ........................ 10-2022-0012203

(51) Int. Cl.
*H02M 7/219* (2006.01)
*H02M 1/00* (2006.01)
*H02M 3/335* (2006.01)

(52) U.S. Cl.
CPC ......... *H02M 7/219* (2013.01); *H02M 1/0043* (2021.05); *H02M 3/33571* (2021.05)

(58) Field of Classification Search
CPC .. H02M 1/007; H02M 3/335; H02M 3/33571; H02M 7/219
See application file for complete search history.

(56) References Cited

U.S. PATENT DOCUMENTS 8,576,582 B2 * 11/2013 Iwaya .................... H02M 1/40 363/17
10,673,343 B1 * 6/2020 Tong .................. H02M 3/3376
(Continued)

FOREIGN PATENT DOCUMENTS

JP 6711449 B 6/2020
KR 101303002 B1 9/2013
(Continued)

OTHER PUBLICATIONS

Extended European Search Report for related European Application No. 23747323.6; action dated Oct. 21, 2025; (10 pages).
(Continued)

*Primary Examiner* — Gary L Laxton
(74) *Attorney, Agent, or Firm* — K&L Gates LLP

(57) ABSTRACT

A power solid-state transformer module, according to one embodiment of the present disclosure, comprises: an AC-DC active front end (AFE) rectifier for converting inputted low-frequency high-voltage AC into DC; and a dual active bridge (DAB) converter connected to the AFE rectifier and carrying out DC-DC conversion. The AFE rectifier comprises: a three-level half-bridge for converting the DC converted in the AFE rectifier into high-frequency AC; a transformation unit for receiving the converted high-frequency AC at a primary side and transforming same into low-voltage AC at a secondary side; and a two-level full-bridge for converting the low-voltage AC into DC.

12 Claims, 3 Drawing Sheets

10

(56) References Cited

U.S. PATENT DOCUMENTS

| | | | | |
|---|---|---|---|---|
| 2002/0024824 | A1 * | 2/2002 | Reinold | H02M 3/285<br>363/17 |
| 2017/0063251 | A1 * | 3/2017 | Ye | H02M 3/33576 |
| 2019/0238059 | A1 * | 8/2019 | Dai | H02M 3/33576 |
| 2022/0311330 | A1 * | 9/2022 | Lu | H02M 7/219 |
| 2022/0337166 | A1 * | 10/2022 | Chan | H02J 7/06 |
| 2022/0407404 | A1 * | 12/2022 | Mohzani | H02M 1/0012 |
| 2023/0006540 | A1 * | 1/2023 | Wang | H02M 1/0095 |

FOREIGN PATENT DOCUMENTS

| | | | |
|---|---|---|---|
| KR | 20170046982 | A | 5/2017 |
| KR | 101817903 | B1 | 1/2018 |
| KR | 102181321 | B1 | 11/2020 |
| KR | 20210145889 | A | 12/2021 |

OTHER PUBLICATIONS

Kolar, et al.; "Solid-State-Transformers: Key Components of Future Traction and Smart Grid Systems"; IEEE; Proceedings of the International Power Electronics Conference; 2014; (15 pages).
Ruiz, et al.; "Surveying Solid-State Transformer Structure and Controls: Providing Highly Efficient and Controllable Power Flow in Distribution Grids"; IEEE Industral Electronics Magaine; vol. 14, No. 1; Mar. 2020; (15 pages).
Huber, et al.; "Volume/weight/cost compairson of a 1MVA 10 kV/400 V solid-state against a conventional low-frequency distribution transformer"; 2014 IEEE Energy Conversion Congress and Exposition; Sep. 2014; (8 pages).
International Search Report for related International Application No. PCT/KR2023/001157; action dated Aug. 3, 2023; (3 pages).
Written Opinion for related International Application No. PCT/KR2023/001157; action dated Aug. 3, 2023; (4 pages).

* cited by examiner

10

POWER SOLID-STATE TRANSFORMER MODULE AND TRANSFORMER USING SAME

CROSS-REFERENCE TO RELATED APPLICATIONS

This application is the National Stage filing under 35 U.S.C. 371 of International Application No. PCT/KR2023/001157, filed on Jan. 26, 2023, which claims the benefit of earlier filing date and right of priority to Korean Application No. 10-2022-0012203, filed on Jan. 27, 2022, the contents of which are all hereby incorporated by reference herein in their entirety.

FIELD

The present invention relates to semiconductor transformer technology for power.

BACKGROUND

Power transformers serve to divide power through a voltage variation function at branch points for power transmission, power distribution, and electrical distribution in systems. However, since existing power transformers use a method of directly varying a low-frequency AC voltage, elements are large, and thus volume and mass thereof are large, and input and output control is impossible.

In order to solve problems of existing power transformers, a semiconductor transformer (solid-state transformer (SST)) has been proposed. In other words, semiconductor transformers use a method in which a configuration of a power conversion device has been changed in a more efficient manner as compared to the existing power transformers. Such semiconductor transformers can be applied to various technologies such as renewable energy, DC distribution, and electric vehicle charging through DC links.

In particular, semiconductor transformers can implement various functions of converting AC/DC power and controlling power factors and harmonic waves as well as varying voltages. In the semiconductor transformers, by adopting high-frequency transformers, the volume and weight can be considerably reduced as compared to the existing power transformers. In addition, a high voltage cannot be input to a unit SST due to a limitation in semiconductor switch capacity, but a high voltage can be input to a modular SST including unit SSTs connected in series.

However, conventional semiconductor transformers are implemented in a topology in which each module performing a plurality of conversions includes a significant number of switch elements, and thus there is a problem in an increase in manufacturing costs.

However, the above-described content merely provides background information related to the present invention and does not correspond to previously disclosed technology.

SUMMARY

In order to solve the above problems, the present invention is directed to providing a power semiconductor transformer module implemented in a topology in which the number of switch elements is minimized, thereby reducing manufacturing costs.

The present invention is also directed to providing a power semiconductor transformer module implemented in a new type topology including a dual active bridge (DAB).

However, objects to be solved by the present invention are not limited to the objects described above, and other objects that are not described will be clearly understood by a person skilled in the art from the description below.

In order to solve the above problems, a power semiconductor transformer module according to one embodiment of the present invention includes an AC-DC active front end (AFE) rectifier configured to convert low-frequency and high-voltage AC into DC, and a dual active bridge (DAB) converter connected to the AFE rectifier to perform DC-to-DC conversion.

The AFE rectifier may include a half bridge which has three levels and converts the DC converted by the AFE rectifier into high-frequency AC, a transformation portion in which a primary side receives the converted high-frequency AC, and a secondary side transforms the received high-frequency AC into low-voltage AC, and a full bridge which has two levels and converts the low-voltage AC into DC.

The DAB converter may include a half bridge which has three levels and converts the DC converted by the AFE rectifier into high-frequency AC, a transformation portion in which a primary side receives the converted high-frequency AC, and a secondary side transforms the received high-frequency AC into low-voltage AC, and a full bridge which has two levels and converts the low-voltage AC into DC.

The half bridge may include four switch elements ($S_{31}$, $S_{32}$, $S_{33}$, $S_{34}$) connected in series and two diodes ($D_{31}$, $D_{32}$) connected in series.

One end of the switch element ($S_{31}$) and one end of the switch element ($S_{32}$) may be connected, the other end of the switch element ($S_{32}$) and one end of the switch element ($S_{33}$) may be connected to serve as a first output terminal of the half bridge, the other end of the switch element ($S_{33}$) and one end of the switch element ($S_{34}$) may be connected, the other end of the switch element ($S_{31}$) may be connected to a first output terminal of the AFE rectifier, and the other end of the switch element ($S_{34}$) may be connected to a second output terminal of the AFE rectifier The other end of the diode ($D_{31}$) and one end of the diode ($D_{32}$) may be connected to serve as a second output terminal of the half bridge, one end of the diode ($D_{31}$) may be connected to the one end of the switch element ($S_{31}$), and the other end of the diode ($D_{32}$) may be connected to the other end of the switch element ($S_{33}$).

The half bridge may have each of a first level state in which the switch elements ($S_{31}$ and $S_{32}$) are turned on and the switch elements ($S_{33}$ and $S_{34}$) are turned off, a second level state in which the switch elements ($S_{32}$ and $S_{33}$) are turned on and the switch elements ($S_{31}$ and $S_{34}$) are turned off, and a third level state in which the switch elements ($S_{31}$ and $S_{32}$) are turned off and the switch elements ($S_{33}$ and $S_{34}$) are turned on.

As a voltage between the first output terminal and the second output terminal of the half bridge, $V_{DC}/2$ may be applied in the first level state, 0 V may be applied in the second level state, and $-V_{DC}/2$ may be applied in the third level state, wherein $V_{DC}$ is a voltage between the first output terminal and the second output terminal of the AFE rectifier.

The half bridge repeatedly may repeatedly perform a first process of sequentially changing states from the first level state to the third level state, and then a second process of sequentially changing states from the third level state to the first level state.

The full bridge may include four switch elements ($S_{41}$, $S_{42}$, $S_{43}$, $S_{44}$).

One end of the switch element ($S_{41}$) and one end of the switch element ($S_{42}$) may be connected to be connected to a first output terminal of the transformation portion, and one end of the switch element ($S_{43}$) and one end of the switch element ($S_{44}$) may be connected to be connected to a second output terminal of the transformation portion.

The other end of the switch element ($S_{41}$) and the other end of the switch element ($S_{43}$) may be connected to one end of a first DC link capacitor to serve as a first output terminal of the DAB converter, and the other end of the switch element ($S_{42}$) and the other end of the switch element ($S_{44}$) may be connected to the other end of the first DC link capacitor to serve as a second output terminal of the DAB converter.

The full bridge may have each of a first level state in which the switch elements ($S_{41}$ and $S_{44}$) are turned on and the switch elements ($S_{42}$ and $S_{43}$) are turned off, and a second level state in which the switch elements ($S_{41}$ and $S_{44}$) are turned off and the switch elements ($S_{42}$ and $S_{43}$) are turned on.

A power semiconductor transformer according to one embodiment of the present invention includes a plurality of semiconductor transformer modules connected in series with each other with respect to an AC power source, wherein each semiconductor transformer module includes an AFE rectifier configured to convert low-frequency and high-voltage AC power into DC, and a DAB converter connected to the AFE rectifier to perform DC-to-DC conversion, wherein the AFE rectifier include a half bridge which has three levels and converts the DC converted by the AFE rectifier into high-frequency AC, a transformation portion in which a primary side receives the converted high-frequency AC, and a secondary side transforms the received high-frequency AC into low-voltage AC, and a full bridge which has two levels and converts the low-voltage AC into DC.

The DAB converter may include a half bridge which has three levels and converts the DC converted by the AFE rectifier into high-frequency AC, a transformation portion in which a primary side receives the converted high-frequency AC, and a secondary side transforms the received high-frequency AC into low-voltage AC, and a full bridge which has two levels and converts the low-voltage AC into DC.

According to the present invention configured as described above, there is an advantage in that the number of switch elements in a power semiconductor transformer can be minimized to reduce manufacturing costs.

In particular, according to the present invention, there is an advantage in that switch elements with the same rating can be used in all active front end (AFE) rectifiers to reduce manufacturing costs.

In addition, according to the present invention, there is an advantage capable of providing a new type topology using a dual active bridge (DAB) in a power semiconductor transformer module.

The effects obtainable in the present invention are not limited to the effects described above, and other effects that are not described will be clearly understood by a person skilled in the art from the description below.

DETAILED DESCRIPTION

Figure 1:
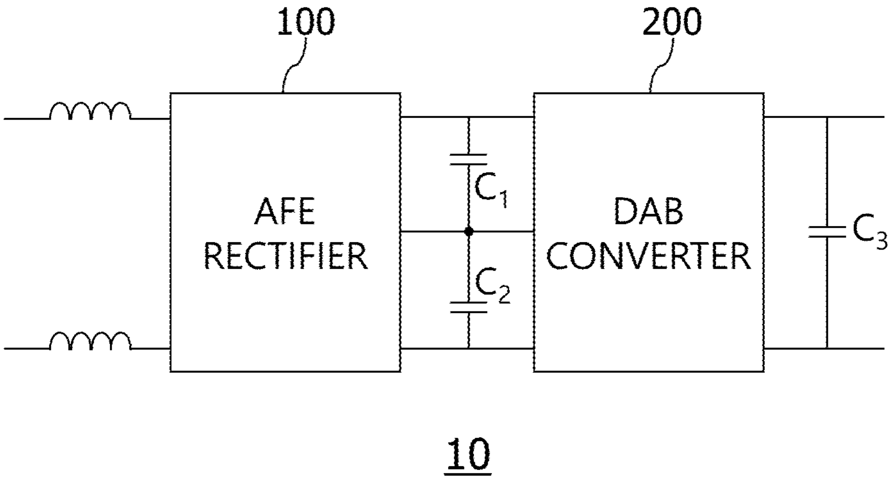
FIG. 1 is a schematic view illustrating a configuration of a semiconductor transformer module (10) according to one embodiment of the present invention.

The above-described objects and means of the present invention and the effects associated therewith will become more apparent through the following detailed description in conjunction with the accompanying drawings. Accordingly, those skilled in the art to which the present invention pertains can readily implement the technical spirit of the present invention. In addition, when it is determined that detailed descriptions of related well-known functions unnecessarily obscure the gist of the present invention during the description of the present invention, the detailed descriptions will be omitted.

Terms used herein are for the purpose of describing embodiments only and are not intended to limit the present invention. In the present specification, the singular forms "a" and "an" are intended to include the plural forms as well in some cases, unless the context clearly indicates otherwise. In the present specification, terms such as "comprise," "comprising," "include," "including," "have," and/or "having," do not preclude the presence or addition of one or more other components other than the components described.

In the present specification, terms such as "or," "at least one," and the like may represent one of the words listed together or may represent a combination of two or more. For example, "A or B" and "at least one of A and B" may include only one of A or B, and may include both A and B.

In the present specification, descriptions following "for example" may not exactly match the information presented, such as cited characteristics, variables, or values, and embodiments of the present invention according to various embodiments of the present invention should not be limited by effects such as modifications including limits of tolerances, measurement errors, and measurement accuracy, and other commonly known factors.

In the present specification, when it is described that one component is "connected" or "coupled" to another component, it should be understood that the one component may be directly connected or joined to another component but an additional component may be present therebetween. However, when one component is described as being "directly connected," or "directly coupled" to another component, it should be understood that the additional component may be absent between the one component and another component.

In the present specification, when one component is described as being "on" or "in contact with" another component, it should be understood that the one component may be directly in contact with or connected to another component, but additional component may be present between the one component and another component. However, when one component is described as being "directly on" or "in direct contact with" another component, it should be understood that there is no additional component between the one component and another component. Other expressions describing the relationship between components, such as "between ~," "directly between ~," and the like should be interpreted in the same way.

In the present specification, terms such as "first" and "second" may be used to describe various components, but the components should not be limited by the above terms. In addition, the above terms should not be interpreted as limiting the order of each component but may be used for the purpose of distinguishing one component from another. For example, a "first component" could be termed a "second component," and similarly, a "second component" could also be termed a "first component."

Unless defined otherwise, all terms used herein may be used in a sense commonly understood by those skilled in the art to which the present invention pertains. Further, terms defined in a commonly used dictionary are not to be interpreted ideally or excessively unless otherwise defined.

Hereinafter, exemplary embodiments according to the present invention will be described in detail with reference to the accompanying drawings.

Figure 2:
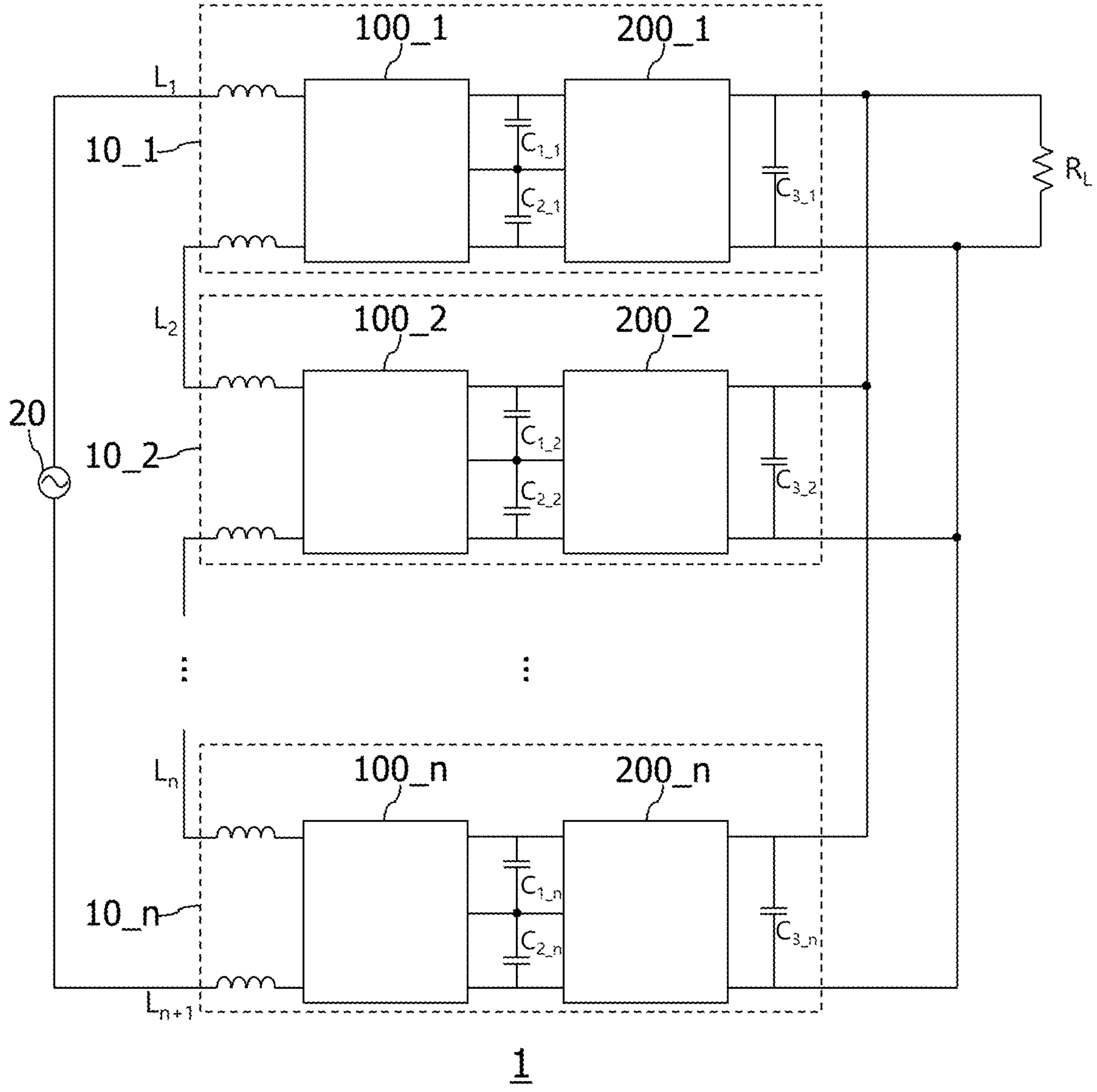
FIG. 2 is a schematic view illustrating a configuration of a transformer (1) according to one embodiment of the present invention.

FIG. 1 is a schematic view illustrating a configuration of a semiconductor transformer module 10 according to one embodiment of the present invention. FIG. 2 is a schematic view illustrating a configuration of a transformer 1 according to one embodiment of the present invention.

Referring to FIG. 1, the semiconductor transformer module 10 according to one embodiment of the present invention includes a semiconductor transformer circuit in which an AC-DC active front end (AFE) rectifier 100 and a dual active bridge (DAB) converter 200 are coupled. As shown in FIG. 2, the semiconductor transformer module 10 may be one of a plurality of modules 10_1, 10_2, . . . and 10_n included in the transformer 1. In this case, the transformer 1 is a semiconductor transformer (solid state transformer (SST)) used for power. As an example, the semiconductor transformer I used for power may serve to divide power through a voltage variation function at branch points for power transmission, power distribution, and electrical distribution in a system. However, the semiconductor transformer 1 may have a reduced size and high efficiency as compared to existing power transformers which are heavy and bulky.

In this case, in the semiconductor transformer 1, low-frequency and high-voltage sine waves are converted into high-frequency and high-voltage square waves and then converted to a low voltage. Afterwards, the power converted to a low voltage may be finally converted back to low frequency waves to be output. In this case, a high frequency is a frequency higher than the commercial frequency (60 Hz). As an example, a low frequency may be 60 Hz or the like, and a high frequency may be 10 KHz or the like, but the present invention is not limited thereto.

The semiconductor transformer 1 may be implemented as a series system and may include the semiconductor transformer modules 10_1, 10_2, . . . , and 10_n which are a plurality of sub-systems connected in series with each other with respect to a power source 20, wherein n is a natural number of 2 or more.

When a plurality of semiconductor transformer modules 10_1, 10_2, . . . , and 10_n are provided, a first power line $L_1$ is provided between a first input terminal of the power source 20 and a first input terminal of a first semiconductor transformer module 10_1, a second power line $L_2$ is provided between a second input terminal of the first semiconductor transformer module 10_1 and a first input terminal of a second semiconductor transformer module 10_2, an $n^{th}$ power line $L_n$ is provided between a second input terminal of an $(n-1)^{th}$ semiconductor transformer module 10_n-1 and a first input terminal of an $n^{th}$ semiconductor transformer module 10_n, and an $(n+1)^{th}$ power line $L_{n+1}$ is provided between a second input terminal of the $n^{th}$ semiconductor transformer module 10_n and a second input terminal of the power source 20. Accordingly, power of the power source 20 is transmitted through lines $L_1$, L2, . . . , Ln, and $L_{n+1}$ and sequentially supplied to the semiconductor transformer modules 10_1, 10_2, . . . and 10_n. However, in FIG. 1 or the like, inductors are illustrated as being connected to the lines $L_1$, L2, . . . , Ln, and $L_{n+1}$, but the present invention is not limited thereto. That is, active elements (such as inductors) or passive elements (such as resistors) may be additionally connected to the lines $L_1$, L2, . . . , Ln, and $L_{n+1}$.

In addition, first output terminals of the semiconductor transformer module 10_1, 10_2, . . . , and 10_n are connected to a first terminal of a load $R_L$, and second output terminals of the semiconductor transformer modules 10_1, 10_2, . . . , and 10_n are connected to a second terminal of the load $R_L$.

That is, power of the power source 20 is distributed in series and provided to each semiconductor transformer module 10_1, 10_2, . . . or 10_n according to its load, each semiconductor transformer module 10_1, 10_2, . . . or 10_n performs a transforming function on the power distributed in series, and the transformed power is transmitted to the load $R_L$. In this case, each of the semiconductor transformer modules 10_1, 10_2, . . . , and 10_n may include the AFE rectifier 100 and the DAB converter 200 which are transformer circuits for a transforming function. In addition, a controller (not shown) for controlling such a transforming function may be included in the transformer 1.

Of course, the semiconductor transformer 1 may include only one semiconductor transformer module 10. In this case, the second power line $L_2$ may be connected between a first input terminal of the semiconductor transformer module 10 and the second input terminal of the power source 20.

Meanwhile, the load $R_L$ shown in FIG. 2 may be a line such as a distribution line, a DC-AC converter, or various systems that perform specific functions using transformed DC power. As an example, the load $R_L$ may be a system including an inverter or a programmable logic controller (PLC) that controls the driving of an electric motor and may be a system for various functions related to measurement, communication, input, output, calculation, and the like, but the present invention is not limited thereto.

As an example, an SST may be applied to a distribution system. Such SSTs may be classified into a non-modular SST, a semi-Modular SST, and a modular SST. The semiconductor transformer 1 according to the present invention may be a modular SST in which the semiconductor transformer modules 10_1, 10_2, . . . , and 10_n are connected in series.

Figure 3:
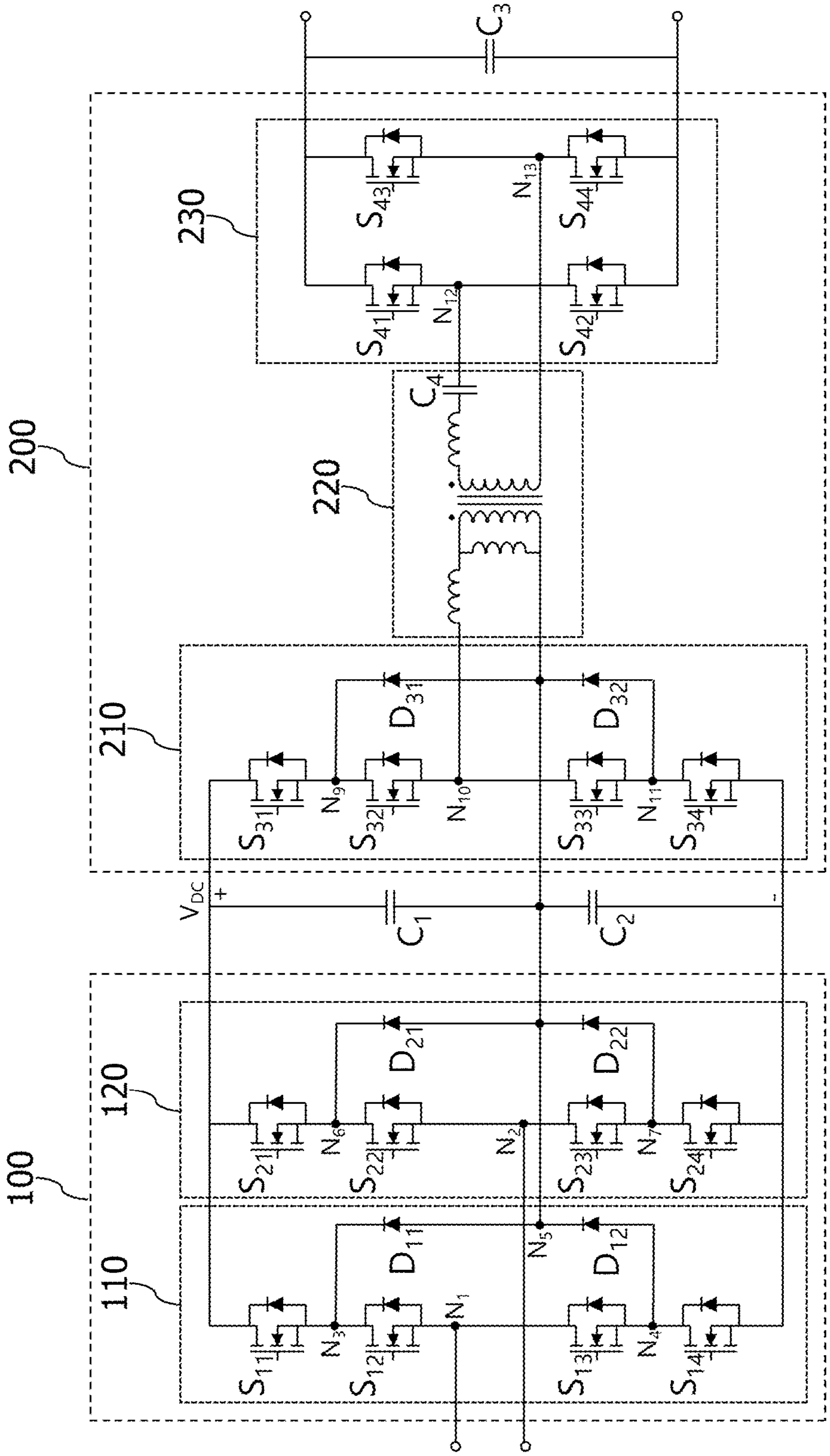
FIG. 3 illustrates a detailed circuit (that is., a topology) of the semiconductor transformer module (10) according to one embodiment of the present invention.

FIG. 3 illustrates a detailed circuit (that is., a topology) of the semiconductor transformer module 10 according to one embodiment of the present invention.

Referring to FIGS. 1 to 3, in each of the semiconductor transformer modules 10_1, 10_2, . . . , and 10_n, the AFE rectifier 100 and the DAB converter 200 may be connected in series, and DC link capacitors $C_1$ and $C_2$ may be connected in series therebetween.

That is, a first output terminal of the AFE rectifier 100 is connected to one end of a first DC link capacitor $C_1$ and a first input terminal of the DAB converter 200, and a second output terminal of the AFE rectifier 100 is connected to the other end of a second DC link capacitor $C_2$ and a second input terminal of the DAB converter 200. In this case, the other end of the first DC link capacitor $C_1$ and one end of the second DC link capacitor $C_2$ are connected, and a node $N_2$ is formed therebetween.

In addition, a first input terminal of the AFE rectifier 100 to which any one line of the power source is connected is connected to a node $N_1$, and a second input terminal of the AFE rectifier 100 to which the other line of the power source is connected is connected to the node $N_2$. That is, the node $N_1$ is connected to one of the lines $L_1$, L2, . . . , Ln, and $L_{n+1}$, and the node $N_2$ is connected to another one of the lines $L_1$, L2, . . . , Ln, and $L_{n+1}$. As an example, when the semiconductor transformer module 10 is a first module in the semiconductor transformer 1, the node $N_1$ is connected to the line $L_1$, and the node $N_2$ is connected to the line $L_2$.

In addition, one end and the other end of a DC link capacitor $C_3$ are connected to the first and second output terminals of the DAB converter 200, respectively. However, unlike that shown in FIGS. 1 to 3, the first and second DC link capacitors $C_1$ and $C_2$ may be components included in the AFE rectifier 100, and the DC link capacitor $C_3$ may be a component included in the DAB converter 200.

Hereinafter, the detailed connection and operation of each component of a topology implementing the semiconductor transformer module 10 will be described.

By using a switch element capable of controlling turn-on/off, the AFE rectifier 100 actively controls low-frequency AC power output from the power source 20 and convert the low-frequency AC power into DC power. The AFE rectifier 100 has advantages of controlling a voltage of the DC link capacitors $C_1$ and $C_2$ (hereinafter referred to as "link voltage"), maintaining a constant DC link voltage, controlling a power factor of an input, and removing harmonic waves included in an input current.

That is, the AFE rectifier 100 may be a controllable rectifier in which an existing diode element is changed into a switch element such as an insulated gate bipolar transistor (IGBT) metal oxide silicon field effect transistor (MOSFET), may provide bidirectional power exchange between AC and DC, may regenerate reusable power to a main power source to reduce power costs, and may considerably lower a peak of a current using pulse width modulation (PWM) modulation.

The AFE rectifier 100 includes two full bridge legs 110 and 120 each having three levels, and first and second full bridge legs 110 and 120 form one full bridge. In this case, the first full bridge leg 110 includes four switch elements $S_{11}$, $S_{12}$, $S_{13}$, and $S_{14}$ and two diodes $D_{11}$ and $D_{12}$. Likewise, the second full bridge 120 includes four switch elements $S_{21}$, $S_{22}$, $S_{23}$, and $S_{24}$ and two diodes $D_{21}$ and $D_{22}$.

According to the topology having such a configuration, the AFE rectifier 100 has an advantage capable of minimizing the number of components such as switch elements at various rated voltages (for example, 13.2 kV in series). In particular, when a two-level full bridge is applied to an AFE rectifier, since the rating of a switch element is changed, switch elements and passive elements with different ratings should be used, which causes a problem in an increase in manufacturing costs. On the other hand, in the present invention, by applying full bridge legs having three levels to the AFE rectifier 100, switch elements having the same rating may be used, thereby lowering manufacturing costs.

Whether to turn on or off the switch elements $S_{11}$, $S_{12}$, $S_{13}$, $S_{14}$, $S_{21}$, $S_{22}$, $S_{23}$, and $S_{24}$ of the first and second full bridge legs 110 and 120 is determined according to a control signal of the controller (not shown). For example, the switch elements $S_{11}$, $S_{12}$, $S_{13}$, $S_{14}$, $S_{21}$, $S_{22}$, $S_{23}$, and $S_{24}$ may be power switch elements such as IGBTs, MOSFETs, or gate turn-off thyristors (GTOs).

Each of the switch elements $S_{11}$, $S_{12}$, $S_{13}$, $S_{14}$, $S_{21}$, $S_{22}$, $S_{23}$, and $S_{24}$ includes three electrodes. In this case, one of the three electrodes is a gate G, another one (for example, one end) is a first electrode, and still another one (that is, the other end) is a second electrode. For example, when the switch elements $S_{11}$, $S_{12}$, $S_{13}$, $S_{14}$, $S_{21}$, $S_{22}$, $S_{23}$, and $S_{24}$ are the MOSFETs, one of the first electrode and the second electrode may be a source S, and the other one may be a drain D. In each of the switch elements $S_{11}$, $S_{12}$, $S_{13}$, $S_{14}$, $S_{21}$, $S_{22}$, $S_{23}$, and $S_{24}$, a control signal line of the controller (not shown) may be connected to the gate G, and an additional diode may be connected between the first electrode and the second electrode.

In the first full bridge leg 110, the switch element $S_{11}$, $S_{12}$, $S_{13}$, and $S_{14}$ are connected in series. That is, the other end of the switch element $S_{11}$ and one end of the switch element $S_{12}$ are connected to form a node $N_3$, the other end of the switch element $S_{12}$ and one end of the switch element $S_{13}$ are connected to form the node $N_1$, and the other end of the switch element $S_{13}$ and one end of the switch element $S_{14}$ are connected to form a node $N_4$. In this case, one end of the switch element $S_{11}$ may be connected to one end of the first DC link capacitor $C_1$ to serve as the first output terminal of the AFE rectifier 100, and the other end of the switch element $S_{14}$ may be connected to the other end of the second DC link capacitor $C_2$ to serve as the second output terminal of the AFE rectifier 100.

In addition, in the first full bridge leg 110, the diodes $D_{11}$ and $D_{12}$ are also connected in series. That is, the other end of the diode $D_{11}$ and one end of the diode $D_{12}$ are connected to form a node $N_5$. In this case, one end of the diode $D_{11}$ is connected to the node $N_3$, and the other end of the diode $D_{12}$ is connected to the node $N_4$.

Likewise, in the second full bridge 120, the switch elements $S_{21}$, $S_{22}$, $S_{23}$, and $S_{24}$ are connected in series. That is, the other end of the switch element $S_{21}$ and one end of the switch element $S_{22}$ are connected to form a node $N_6$, the other end of the switch element $S_{22}$ and one end of the switch element $S_{23}$ are connected to form the node $N_2$, and the other end of the switch element $S_{23}$ and one end of the switch element $S_{24}$ are connected to form a node $N_7$. In this case, one end of the switch element $S_{21}$ may be connected to one end of the first DC link capacitor $C_1$ to serve as the first output terminal of the AFE rectifier 100, and the other end of the switch element $S_{24}$ may be connected to one end of a capacitor $C_4$ to serve as the second output terminal of the AFE rectifier 100.

In addition, in the second full bridge 120, the diodes $D_{21}$ and $D_{22}$ are also connected in series. That is, the other end of the diode $D_{21}$ and one end of the diode $D_{22}$ are connected to each other and connected to the node $N_5$. In this case, one end of the diode $D_{21}$ is connected to the node $N_6$, and the other end of the diode $D_{22}$ is connected to the node $N_7$.

The first and second full bridge legs 110 and 120 each have three levels. That is, in the first full bridge leg 110, a first level corresponds to a state in which the switch elements $S_{11}$ and $S_{12}$ are turned on and the switch elements $S_{13}$ and $S_{14}$ are turned off, a second level corresponds to a state in which the switch elements $S_{11}$ and $S_{12}$ are turned off and the switch elements $S_{13}$ and $S_{14}$ are turned on, and a third level corresponds to a state in which the switch elements $S_{11}$ and $S_{14}$ are turned on. Likewise, in the second full bridge 120, a first level corresponds to a state in which the switch elements $S_{21}$ and $S_{22}$ are turned on and the switch elements $S_{23}$ and $S_{24}$ are turned off, a second level corresponds to a state in which the switch elements $S_{21}$ and $S_{22}$ are turned off and the switch elements $S_{23}$ and $S_{24}$ are turned on, and a third level corresponds to a state in which the switch elements $S_{21}$ and $S_{24}$ are turned on. Accordingly, a total of five levels may be output by the first and second full bridge legs 110 and 120. That is, when a voltage between the first output terminal and the second output terminal of the AFE rectifier 100 (that is, a voltage between one end of the first DC link capacitor $C_1$ and the other end of the second DC link capacitor $C_2$) is assumed to be $V_{DC}$, according to a combination operation of the first and second full bridge legs 110 and 120 each having three levels, a voltage between the node $N_1$ and the node $N_2$ may exhibit a total of five levels of $V_{DC}$, $V_{DC}/2$, 0 V, $-V_{DC}/2$, and $-V_{DC}$.

The DAB converter 200 may operate as a DC-DC converter and may perform a first operation of converting a DC converted in the AFE rectifier 100 into a high-frequency AC, a second operation of transforming the converted high-frequency AC into a high-frequency and low-voltage AC, and a third operation of converting the high-frequency and low-voltage AC into low-voltage DC. The DAB converter 200 may be one of DC-DC converters. Unlike bidirectional resonant converters such as capacitor—inductor—inductor—capacitor (CLLC) converters, the DAB converter 200 has an advantage in that a direction change of a load current is smooth, and a power direction is easily controlled by a phase shift.

The DAB converter 200 includes a half bridge 210 that has three levels and performs the first operation, a transformation portion 220 (also referred to as a transformation unit) that performs the second operation, and a third full bridge 230 that has two levels and performs the third operation. In this case, the half bridge 210 includes four switch elements $S_{31}$, $S_{32}$, $S_{33}$, and $S_{34}$ and two diodes $D_{31}$ and $D_{32}$. The transformation portion 220 includes a primary side and a secondary side. The full bridge 230 includes four switch elements $S_{41}$, $S_{42}$, $S_{43}$, and $S_{44}$.

Each of the switch elements $S_{31}$, $S_{32}$, $S_{33}$, $S_{34}$, $S_{41}$, $S_{42}$, $S_{43}$, and $S_{44}$ includes three electrodes. In this case, one of the three electrodes is a gate G, another one (for example, one end) is a first electrode, and still another one (that is, the other end) is a second electrode. For example, when the switch elements $S_{31}$, $S_{32}$, $S_{33}$, $S_{34}$, $S_{41}$, $S_{42}$, $S_{43}$, and $S_{44}$ are MOSFETs, one of the first electrode and the second electrode may be a source S, and the other one may be a drain D. In each of the switch elements $S_{31}$, $S_{32}$, $S_{33}$, $S_{34}$, $S_{41}$, $S_{42}$, $S_{43}$, and $S_{44}$, the control signal line of the controller (not shown) may be connected to the gate G, and an additional diode may be connected between the first electrode and the second electrode.

In the half bridge 210, the switch element $S_{31}$, $S_{32}$, $S_{33}$, and $S_{34}$ are connected in series. That is, the other end of the switch element $S_{31}$ and one end of the switch element $S_{32}$ are connected to form a node $N_9$, the other end of the switch element $S_{32}$ and one end of the switch element $S_{33}$ are connected to form a node $N_{10}$, and the other end of the switch element $S_{33}$ and one end of the switch element $S_{34}$ are connected to form a node $N_{11}$. In this case, one end of the switch element $S_{31}$ may be connected to one end of the first DC link capacitor $C_1$ to serve as the first input terminal of the DAB converter 200, and the other end of the switch element $S_{34}$ may be connected to the other end of the second DC link capacitor $C_2$ to serve as the second input terminal of the AFE rectifier 100.

In addition, in the half bridge 210, the diodes $D_{31}$ and $D_{32}$ are also connected in series. That is, the other end of the diode $D_{31}$ and one end of the diode $D_{32}$ are connected to each other and connected to the node $N_5$. In this case, one end of the diode $D_{31}$ is connected to the node $N_9$, and the other end of the diode $D_{32}$ is connected to the node $N_{11}$.

A first output terminal of the half bridge 210 connected to a first input terminal of the transformation portion 220 is the node $N_{10}$, and a second output terminal of the half bridge 210 connected to a second input terminal of the transformation portion 220 is the node $N_5$.

The half bridge 210 has three levels. That is, in the half bridge 210, a first level corresponds to a state in which the switch elements $S_{31}$ and $S_{32}$ are turned on and the switch elements $S_{33}$ and $S_{34}$ are turned off, a second level corresponds to a state in which the switch elements $S_{32}$ and $S_{33}$ are turned on and the switch elements $S_{31}$ and $S_{34}$ are turned off, and a third level corresponds to a state in which the switch elements $S_{31}$ and $S_{32}$ are turned off and the switch elements $S_{33}$ and $S_{34}$ are turned on. In this case, as a voltage between a first output terminal $N_{10}$ and a second output terminal $N_5$ of the half bridge 210, $V_{DC}/2$ may be applied at the first level, 0 V may be applied at the second level, and $-V_{DC}/2$ may be applied at the third level. As an example, according to a control signal of the controller, a first process of sequentially changing levels from the first level to the third level, and then, a second process of sequentially changing levels from the third level to the first level may be repeatedly performed to perform a first operation of converting DC converted in the AFE rectifier 100 into high-frequency AC.

The primary side and the secondary side of the transformation portion 220 may each include coils having various windings. In this case, it may be preferable that a number of turns of coils of the primary side be greater than a number of coil turns of coils of the secondary side. That is, a converted high-frequency AC input to the primary side is transformed into high-frequency and low-voltage AC according to a relationship between the number of turns in the primary side and the secondary side.

In this case, a first input terminal of the primary side serves as the first input terminal of the transformation portion 220 and is connected to the node $N_{10}$ which is the first output terminal of the half bridge 210. A second input terminal of the primary side serves as the second input terminal of the transformation portion 220 and is connected to the node $N_5$ which is the second output terminal of the half bridge 210. In addition, an active element (such as an inductor) or a passive element (such as a resistor) may be additionally connected to the primary side.

A first output terminal of the secondary side serves as a first output terminal of the transformation portion 220 and is connected to a node $N_{12}$ which is a first input terminal of the third full bridge 230. A second output terminal of the secondary side serves as a second output terminal of the transformation portion 220 and is connected to a node $N_{13}$ which is a second input terminal of the third full bridge 230. In addition, an active element (such as an inductor) or a passive element (such as a resistor) may be additionally connected to the primary side. In particular, the capacitor $C_4$ for a DC blocking function (that is, a function of removing a DC component from transformed low-voltage AC) may be additionally connected to the first or second output terminal of the secondary side.

The third full bridge 230 includes four switch elements $S_{41}$, $S_{42}$, $S_{43}$, and $S_{44}$. Whether to turn on or off the switch elements $S_{41}$, $S_{42}$, $S_{43}$, and $S_{44}$ of the third full bridge 230 is determined according to a control signal of the controller (not shown). For example, the switch elements $S_{41}$, $S_{42}$, $S_{43}$, and $S_{44}$ may be power switch elements such as IGBTs, MOSFETs, or GTOs.

Each of the switch elements $S_{41}$, $S_{42}$, $S_{43}$, and $S_{44}$ includes three electrodes. In this case, one of the three electrodes is a gate G, another one (for example, one end) is a first electrode, and still another one (that is, the other end) is a second electrode. For example, when the switch elements $S_{41}$, $S_{42}$, $S_{43}$, and $S_{44}$ are the MOSFETs, one of the first and second electrodes may be a source S, and the other may be a drain D. In each of the switch elements $S_{41}$, $S_{42}$, $S_{43}$, and $S_{44}$, a control signal line of the controller (not shown) may be connected to the gate G, and an additional diode may be connected between the first electrode and the second electrode.

The switch elements $S_{41}$ and $S_{42}$ connected to each other in series form one full bridge leg, and the switch elements $S_{43}$ and $S_{44}$ connected to each other in series form another full bridge leg. That is, the other end of the switch element $S_{41}$ and one end of the switch element $S_{42}$ are connected to form the node $N_{12}$, and the other end of the switch element $S_{43}$ and one end of the switch element $S_{44}$ are connected to form the node $N_{13}$. In this case, one end of the switch element $S_{41}$ and one end of the switch element $S_{43}$ may be connected to one end of the DC link capacitor $C_3$ to serve as the first output terminal of the DAB converter 200, and the other ends of the switch elements $S_{42}$ and $S_{44}$ may be connected to the other end of the DC link capacitor $C_3$ to serve as the second output terminal of the DAB converter 200. In addition, one end of the DC link capacitor $C_3$ may serve as a first output terminal of the semiconductor transformer module 10 to be connected to a first terminal of the load $R_L$, and the other end of the DC link capacitor $C_3$ may serve as a second output terminal of the semiconductor transformer module 10 to be connected to a second terminal of the load $R_L$.

The third full bridge 230 has two levels. That is, in the third full bridge 230, a first level corresponds to a state in which the switch elements $S_{41}$ and $S_{44}$ are turned on and the switch elements $S_{42}$ and $S_{43}$ are turned off, and a second level corresponds to a state in which the switch elements $S_{41}$ and $S_{44}$ are turned off and the switch elements $S_{42}$ and $S_{43}$ are turned on. Processes of the first level and second level may be repeatedly performed to perform a third operation of converting high-frequency and low-voltage AC converted in the transformation portion 220 into DC, and according to the third operation, DC applied to the DC link capacitor $C_3$ may be transmitted to the load $R_L$.

According to the present invention configured as described above, there is an advantage in that the number of switch elements in a power semiconductor transformer can be reduced to reduce manufacturing costs. In particular, according to the present invention, there is an advantage in that switch elements with the same rating can be used in all AFE rectifiers to reduce manufacturing costs. In addition, according to the present invention, there is an advantage capable of providing a new type topology using a DAB type in a power semiconductor transformer module.

While specific embodiments have been described in the detailed description of the present invention, various modifications may be made without departing from the scope of the present invention. Therefore, the scope of the present invention is defined not by the described embodiment but by the appended claims and encompasses equivalents that fall within the scope of the appended claims.

The present invention relates to a power semiconductor transformer module and a transformer using the same. There can be provided a power semiconductor transformer module implemented in a topology capable of minimizing the number of switch elements to reduce manufacturing costs, and a transformer using the same. Thus, the present invention has industrial applicability.

The invention claimed is:

1. A power semiconductor transformer module comprising:

an AC-DC active front end (AFE) rectifier configured to convert low-frequency and high-voltage AC into DC; and a dual active bridge (DAB) converter connected to the AFE rectifier to perform DC-to-DC conversion, wherein the DAB converter includes:

a half bridge which has three levels and converts the DC converted by the AFE rectifier into high-frequency AC;

a transformation portion in which a primary side receives the converted high-frequency AC, and a secondary side transforms the received high-frequency AC into low-voltage AC;

a full bridge which has two levels and converts the low-voltage AC into DC; and a DC blocking capacitor connected to an output terminal of the secondary side of the transformation portion and configured to remove a DC component from the transformed low-voltage AC, wherein a power transferred through the DAB converter is controlled by a phase shift between the half bridge and the full bridge.

2. The power semiconductor transformer module of claim 1, wherein the half bridge includes a first switch element, a second switch element, a third switch element, and a fourth switch element which are connected in series and a first diode and a second diode which are connected in series, wherein a first end of the first switch element and a first end of the second switch element are connected, a second end of the second switch element and a first end of the third switch element are connected to serve as a first output terminal of the half bridge, a second end of the third switch element and a first end of the fourth switch element are connected, a second end of the first switch element is connected to a first output terminal of the AFE rectifier, a second end of the fourth switch element is connected to a second output terminal of the AFE rectifier, a first end of the first diode and a first end of the second diode are connected to serve as a second output terminal of the half bridge, a second end of the first diode is connected to the first end of the first switch element, and a second end of the second diode is connected to the second end of the third switch element.

3. The power semiconductor transformer module of claim 2, wherein the half bridge has each of a first level state in which the first switch element and the second switch element are turned on and the third switch element and the fourth switch element are turned off, a second level state in which the second switch element and the third switch element are turned on and the first switch element and the fourth switch element are turned off, and a third level state in which the first switch element and the second switch element are turned off and the third switch element and the fourth switch element are turned on, wherein, as a voltage between the first output terminal and the second output terminal of the half bridge, VDC/2 is applied in the first level state, 0 V is applied in the second level state, and −VDC/2 is applied in the third level state, wherein VDC is a voltage between the first output terminal and the second output terminal of the AFE rectifier.

4. The power semiconductor transformer module of claim 3, wherein the half bridge repeatedly performs a first process of sequentially changing states from the first level state to the third level state, and then a second process of sequentially changing states from the third level state to the first level state.

5. The power semiconductor transformer module of claim 1, wherein the full bridge further includes a fifth switch element, a sixth switch element, a seventh switch element, and an eighth switch element, wherein a first end of the fifth switch element and a first end of the sixth switch element (S42) are connected to be connected to a first output terminal of the transformation portion, a first end of the seventh switch element and a first end of the eighth switch element are connected to be connected to a second output terminal of the transformation portion, a second end of the fifth switch element and a second end of the seventh switch element are connected to a first end of a first DC link capacitor to serve as a first output terminal of the DAB converter, and a second end of the sixth switch element and a second end of the eighth switch element are connected to a second end of the first DC link capacitor to serve as a second output terminal of the DAB converter.

6. The power semiconductor transformer module of claim 5, wherein the full bridge has each of a first level state in which the fifth switch element and the eighth switch element are turned on and the sixth switch element and the seventh switch are turned off, and a second level state in which the fifth switch element and the eighth switch elemeny are turned off and the sixth switch element and the seventh switch element are turned on.

7. A modular solid-state transformer (SST) system applied to a distribution system, comprising a plurality of semiconductor transformer modules connected in series with each other with respect to an AC power source, wherein each semiconductor transformer module includes:

an AC-DC active front end (AFE) rectifier configured to convert low-frequency and high-voltage AC power into DC; and a dual active bridge (DAB) converter connected to the AFE rectifier to perform DC-to-DC conversion, wherein the DAB converter includes:

a half bridge which has three levels and converts the DC converted by the AFE rectifier into high-frequency AC;

a transformation portion in which a primary side receives the converted high-frequency AC, and a secondary side transforms the received high-frequency AC into low-voltage AC;

a full bridge which has two levels and converts the low-voltage AC into DC; and a DC blocking capacitor connected to an output terminal of the secondary side of the transformation portion and configured to remove a DC component from the transformed low-voltage AC, wherein a power transferred through the DAB converter is controlled by a phase shift between the half bridge and the full bridge.

8. The modular SST system of claim 7, wherein the half bridge includes a first switch element, a second switch element, a third switch element, and a fourth switch element connected in series and a first diode, and a second diode which are connected in series, wherein a first end of the first switch element and a first end of the second switch element are connected, a second end of the second switch element and a first end of the second switch element are connected to serve as a first output terminal of the half bridge, a second end of the third switch element and a first end of the fourth switch element are connected, a second end of the first switch element is connected to a first output terminal of the AFE rectifier, a second end of the fourth switch element is connected to a second output terminal of the AFE rectifier, a first end of the first diode and a first end of the second diode are connected to serve as a second output terminal of the half bridge, a second end of the first diode is connected to the first end of the first switch element, and a second end of the second diode is connected to the second end of the third switch element.

9. The modular SST system of claim 8, wherein the half bridge has each of a first level state in which the first switch element and the second switch element are turned on and the third switch element and the fourth switch element are turned off, a second level state in which the second switch element and the third switch element are turned on and the first switch element and the fourth switch element are turned off, and a third level state in which the first switch element and the second switch element are turned off and the third switch element and the fourth switch are turned on, wherein, as a voltage between the first output terminal and the second output terminal of the half bridge, VDC/2 is applied in the first level state, 0 V is applied in the second level state, and-VDC/2 is applied in the third level state, wherein VDC is a voltage between the first output terminal and the second output terminal of the AFE rectifier.

10. The module SST system of claim 9, wherein the half bridge repeatedly performs a first process of sequentially changing states from the first level state to the third level state, and then a second process of sequentially changing states from the third level state to the first level state.

11. The module SST system of claim 7, wherein the full bridge includes a fifth switch element, a sixth switch element, a seventh switch element, and a eighth switch, wherein a first end of the fifth switch element and a first end of the sixth switch element are connected to be connected to a first output terminal of the transformation portion, a first end of the seventh switch element and a second end of the seventh switch element are connected to be connected to a second output terminal of the transformation portion, a second end of the fifth switch element and a second end of the seventh switch element are connected to a first end of a first DC link capacitor to serve as a first output terminal of the DAB converter, and a second end of the sixth switch element and a second end of the eighth switch element are connected to a second end of the first DC link capacitor to serve as a second output terminal of the DAB converter.

12. The modular SST system of claim 11, wherein the full bridge has each of a first level state in which the fifth switch element and the eighth switch element are turned on and the sixth switch element and the seventh switch element are turned off, and a second level state in which the fifth switch element and the eighth switch element are turned off and the sixth switch element and the seventh switch element are turned on.

* * * * *